United States Patent [19]

Rainer

[11] Patent Number: 5,064,540

[45] Date of Patent: Nov. 12, 1991

[54] METHOD FOR USING WATER-TREATING SPONGES

[76] Inventor: Norman B. Rainer, 2008 Fondulac Rd., Richmond, Va. 23229

[21] Appl. No.: 672,124

[22] Filed: Mar. 19, 1991

Related U.S. Application Data

[63] Continuation-in-part of Ser. No. 395,535, Aug. 18, 1989.

[51] Int. Cl.$^5$ ............................................... C02F 1/42
[52] U.S. Cl. ................................... 210/688; 210/282; 210/502.1
[58] Field of Search ..................... 210/688, 282, 510.1, 210/502.1

[56] References Cited

U.S. PATENT DOCUMENTS

| 2,364,617 | 12/1944 | Bolser | 210/282 |
| 2,672,984 | 3/1954 | Russell | 210/282 |
| 2,692,683 | 10/1954 | Mason | 210/282 |
| 3,715,339 | 2/1973 | Rainer | 210/688 |
| 4,005,010 | 1/1977 | Lunt | 210/282 |
| 4,168,971 | 9/1974 | Szczepanski | 210/688 |
| 4,332,916 | 6/1982 | Thill | 210/688 |

*Primary Examiner*—Stanley S. Silverman
*Assistant Examiner*—Cynthia L. Nessler
*Attorney, Agent, or Firm*—Norman B. Rainer

[57] ABSTRACT

A water treatment method is provided which employs a bed of small-sized pieces of sponge to absorb dissolved ions from water passed through the bed. The method involves compacting the bed so that its volume, achieved as a result of gravity force alone, is reduced by between 10% and 40%, and employing a flow rate through the bed of between about 0.05 and 2.0 bed volumes/minute.

5 Claims, No Drawings

METHOD FOR USING WATER-TREATING SPONGES

RELATED APPLICATIONS

This application is a continuation-in-part of U.S. patent application Ser. No. 395,535, filed 08/18/89.

BACKGROUND OF THE INVENTION

1. Field of the Invention

This invention relates to water treatment, and more particularly concerns a method for the removal of dissolved ions from water employing a porous sponge material.

2. Description of the Prior Art

U.S. patent application Ser. No. 07/395,535, filed 08/18/89 discloses an open celled product useful in selectively abstracting dissolved ions from aqueous solutions. The product is comprised of a regenerated cellulose sponge and a water insoluble polymer durably associated with the cellulose. The polymer is essentially a polyethyleneimine (PEI) that has been insolubilized in a thermal curing step. The product finds use in removing trace quantities of toxic metals from industrial waste streams and naturally occurring waters such as acid mine drainage water.

U.S. patent application Ser. No. 07/561,006, filed 07/31/90 discloses a particularly preferred small cuboid configuration of the sponge product having a uniform distribution of polymer throughout the sponge and providing improved characteristics during manufacture and use. This product is particularly well suited for use in vertical columns wherein the water to be treated is passed through a bed comprised of a great multitude of the small cuboid sponges. It has been found however, that in such beds of sponges, leakage or "breakthrough" of metal ions sometimes occurs prematurely, namely before the sponge has become saturated with said ions. In instances where it is sought to separate pollutant metals from valuable metals such as gold, sharper separations are desirable.

It is accordingly an object of the present invention to improve the efficiency of utilization of ion-absorbing sponges.

It is another object of this invention to provide a method for increasing the amount of water that can be treated to acceptable specifications by a given quantity of ion-absorbing sponges.

It is a further object of the present invention to provide a method of the aforesaid nature for achieving sharper separation of dissolved gold from ions of base metals.

These objects and other objects and advantages of the invention will be apparent from the following description.

SUMMARY OF THE INVENTION

The above and other beneficial objects and advantages are accomplished in accordance with the present invention by:

a) forming a bed comprised of a great multitude of sponges capable of selectively absorbing dissolved metal ions from aqueous solutions, said sponges being of cuboid or parallelepiped configuration comprised of paired flat parallel primary surfaces spaced apart by a distance representing an X axis having a length between about 5 and 25 mm, and joined by a sidewall perimeter comprised of four surfaces orthogonally disposed to said primary surfaces and causing said sponge to have at least one plane of symmetry perpendicular to said primary surfaces and including the X axis, the shortest straight line distance spanning said perimeter while perpendicularly intersecting said X axis being considered to be a Y axis, and the longest straight line distance spanning said perimeter while perpendicularly intersecting said X axis being considered to be a Z axis, the sum of the X and Y axes being in the range of 10–60 mm, and the Z axis being less than six times the X axis, and less than 90 mm, and b) compressing said bed so that its total volume is between 10% and 40% less than the volume the bed would occupy under gravity force alone.

In a preferred embodiment, the bed of sponges is confined within a vertically oriented circular cylindrical column. In other embodiments, the bed is disposed within a tubular fishnet enclosure.

DESCRIPTION OF THE PREFERRED EMBODIMENT

Sponges useful in the practice of the present invention may be produced by the teachings of parent application Ser. No. 395,535, wherein an open-celled sponge of regenerated cellulose is caused to contain an insolubilized PEI polymer. In its wet form, the sponge is fairly resilient, however excessive compression causes the polymer to mechanically separate from the sponge. When utilized in columns for water treatment, the resultant bed of sponges should have a height/diameter ratio between about 2 and 10. An important characteristic of the sponge product is that high flow rates can be achieved through a bed with only hydrostatic or gravity force. Pressurization is not required, as in the case of most ion exchange resins, which are usually in bead form. Whenever fishnet enclosures are employed to confine the sponges, the mesh size of the fishnet is between about 0.3 and 0.6 times the Z dimension of the sponge.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

One hundred and twenty parts of nitrilotriacetic acid (NTA) were mixed with 140 parts PEI of molecular weight 1800, and 500 parts of water at 40 degrees C. to form a precursor solution having a solids content of 34.2%. Pieces of open celled sponge of regenerated cellulose in the form of cubes measuring 9 mm per side were impregnated with the precursor solution and then squeezed between rollers to produce damp sponges having about 170% add-on of precursor solution. The sponges were dried at 120 degrees C. until dry, then cured at 155 degrees C. for 55 minutes, and washed with water.

The sponges were placed in a vertically upright glass cylinder having 6" inside diameter, 5 foot height and perforated bottom plate, forming an uncompacted bed of 3 foot height. The volumetric throughput of the bed at maximum flow rate is found to be about 1.9 bed volumes/minute, where "bed volume" is the amount of water that can be drained from the bed of water-immersed sponge.

Said bed of sponges was employed to treat acid mine drainage water from the Penn Mine in Colorado containing 11.3 ppm copper. The rate of water passage through the column was maintained at 0.2 bed volume/minute by valve means below the cylinder. In separate experiments, the bed was compacted by means of a weighted perforated disc placed atop the bed. The effluent water was monitored for copper content by atomic absorption analysis. Data obtained are reported in Table 1 wherein "% compaction" refers to the % of diminution of the height of the bed by virtue of the weighted disc, and "Cu (ppm)" designates the level of copper in the effluent water after 5 hours of operation.

TABLE 1

| % Compaction | Cu (ppm) |
| --- | --- |
| 0 | 2.4 |
| 9 | 1.1 |
| 18 | 0.9 |
| 27 | 0.7 |
| 39 | 0.4 |

As the data of Table 1 indicate, compaction of the bed achieves better efficiency of water treatment. The significance of the copper content is that, when the copper is below about 1 ppm, it is in compliance with certain recognized standards concerning various modes of disposition of the effluent water. When the copper level is too high, the treatment is considered to be inadequate. At compaction levels greater than about 40% it is found that the sought flow rate through the column becomes impractical unless pressurization is utilized.

EXAMPLE 2

The sponge product of Example 1 was utilized with the exceptions that the PEI was insolubilized with a mixture of succinic acid and 1,2 dichloro ethane, and the cubes measured 14 mm. The sponge was loaded into a PVC cylinder of 12" inside diameter having disposed therein a tubular fishnet enclosure having a sealed bottom and drawstring top. The "fishnet" is fabricated of high strength synthetic fiber in a manner to have stable openings of about 8 mm. The purpose of the fishnet enclosure is to facilitate removal of metal-saturated sponge from the column. Also, the enclosed sponges can be disposed transversely across a flowing stream to achieve unattended removal of pollutants.

The bed of sponge in the column had an uncompacted height of 7 feet. Said bed of sponges was employed to treat acid mine drainage water from the Argo Tunnel in Colorado containing 133 ppm iron. The rate of water passage through the column was maintained at 0.1 bed volume/minute by a valve downstream from the column. In separate experiments, the bed was compacted by means of a weighted perforated disc placed atop the bed. The effluent water was monitored for dissolved iron content by atomic absorption analysis. Data obtained are reported in Table 2, wherein "Fe (ppm)" designates the level of iron in the effluent water after 5 hours of operation.

TABLE 2

| % Compaction | Fe (ppm) |
| --- | --- |
| 0 | 4.8 |
| 12 | 2.2 |
| 19 | 1.4 |
| 28 | 1.1 |

TABLE 2-continued

| % Compaction | Fe (ppm) |
| --- | --- |
| 38 | 0.7 |

The data of Table 2 again demonstrate the surprising improvement achieved in the efficiency of water treatment by compaction of the bed of sponges.

EXAMPLE 3

The sponge product of Example 1 was utilized with the exception that sponges had a substantially trapezoidal configuration with X=11 mm, Y=12 mm and Z=19 mm. The sponge was loaded into the glass cylinder of Example 1. A second, identical column was plumbed in series to receive the effluent from the first column. An uncompacted bed height of 5 feet was employed in each column.

A "detox" stream was entered into the first column and caused to run through the second column. Said "detox" stream is derived from the washing of an expired pile of gold ore that had been subjected to heap leaching with a dilute solution of sodium cyanide. The detox stream contains 3.5 ppm Cu, 6.2 ppm Fe, 4.8 ppm Ni and 0.15 ppm Au. The primary purpose of treating the detox stream is to reduce the concentrations of toxic heavy metals to levels which permit the effluent water to be employed for farm land irrigation. However, it is also of interest to be able to recover the small quantities of dissolved gold.

The absorption of Cu, Fe and Ni occur essentially simultaneously in the sponges to provide a visibly distinct dark-colored absorption band. The band represents a region of the bed where the sponge has become saturated with transition heavy metals such as Cu, Fe and Ni. The flow rate was maintained at 0.07 bed volume/minute.

In several experiments, the % compaction of the bed in the first column was varied. The flow as continued until the absorption band descended to the bottom of the first column. At this point, flow as stopped, and the bed in the second column was analyzed for gold content by stripping with a Zadra solution consisting of 1% NaOH and 0.5% NaCN at 40 degrees C. The data in Table 3 reports the amount of gold recovered at each compression level. The amount of gold is determined from the concentration of gold in the stripping solution, and the volume of said solution.

TABLE 3

| % Compaction | Au (grams) |
| --- | --- |
| 0 | 0.5 |
| 12 | 1.3 |
| 23 | 1.5 |
| 31 | 2.1 |
| 37 | 2.2 |

As the data of Table 3 indicate, compaction of the bed contributes to a significant increase in gold recovery. Although not wishing to be bound by theoretical interpretations, it is felt that the compaction causes better and thorough ionic equilibrium to be achieved throughout the bed. This causes the gold, which is not as strongly absorbed as other transition metal ions, to be rejected by or displaced from the bed of the first column, and absorbed by the bed of the second column.

In a commercial operation, the first bed, when saturated with transition heavy metals would be replaced with a bed of fresh sponges. In this manner, gold will continue to separate from the initial solution and accumulate in the second bed.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A water treatment method comprising:
   a) forming a bed comprised of a multitude of sponges capable of selectively absorbing dissolved metal ions from aqueous solutions, said sponges being of parallelepiped configuration comprised of paired flat parallel primary surfaces spaced apart by a distance representing an X axis having a length between about 5 and 25 mm, and joined by a sidewall perimeter comprised of four surfaces orthogonally disposed to said primary surfaces and causing said sponge to have at least one plane of symmetry perpendicular to said primary surfaces and including the X axis, the shortest straight line distance spanning said perimeter while perpendicularly intersecting said X axis being considered to be a Y axis, and the longest straight line distance spanning said perimeter while perpendicularly intersecting said X axis being considered to be a Z axis, the sum of the X and Y axes being in the range of 10–60 mm, and the Z axis being less than six times the X axis, and less than 90 mm,
   b) compressing said bed so that its total volume is between 10% and 40% less than the volume the bed would occupy under gravity force alone, and
   c) passing water to be treated through said bed at a rate of between about 0.05 and 2.0 bed volumes/minute.

2. The method of claim 1 wherein said bed is maintained in a circular cylindrical column, and the ratio of height/diameter of said bed is between 2 and 10.

3. The method of claim 1 wherein said bed is maintained within an elongated fishnet type of enclosure.

4. The method of claim 2 employing at least two columns in a manner whereby the effluent from a first column enters a subsequent column.

5. The method of claim 1 wherein said sponges contain insolubilized polyethyleneimine.

* * * * *